United States Patent
Zhou et al.

(10) Patent No.: US 12,274,275 B2
(45) Date of Patent: Apr. 15, 2025

(54) METHOD FOR PREPARING CONCENTRATED HIGH-PROTEIN YOGURT BEFORE FERMENTATION

(71) Applicant: Jiangnan University, Wuxi (CN)

(72) Inventors: Peng Zhou, Wuxi (CN); Dasong Liu, Wuxi (CN); Jing Zhang, Wuxi (CN); Xinyang Qi, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 18/822,352

(22) Filed: Sep. 2, 2024

(65) Prior Publication Data

US 2024/0423226 A1 Dec. 26, 2024

Related U.S. Application Data

(63) Continuation of application No. PCT/CN2023/090012, filed on Apr. 23, 2023.

(30) Foreign Application Priority Data

May 30, 2022 (CN) .......................... 202210600517.9

(51) Int. Cl.
*A23C 9/15* (2006.01)
*A23C 9/123* (2006.01)
*A23C 9/146* (2006.01)

(52) U.S. Cl.
CPC ............ *A23C 9/1512* (2013.01); *A23C 9/123* (2013.01); *A23C 9/146* (2013.01); *A23C 9/1508* (2013.01);
(Continued)

(58) Field of Classification Search
CPC ....... A23C 9/1512; A23C 9/127; A23C 9/146; A23C 9/1508; A23C 9/123
See application file for complete search history.

(56) References Cited

U.S. PATENT DOCUMENTS

| 2010/0021595 A1 | 1/2010 | Bhaskar |
| 2010/0143538 A1* | 6/2010 | Bhaskar ............... A23C 19/076 426/43 |
| 2021/0101126 A1* | 4/2021 | Zhou ...................... A61K 9/19 |

FOREIGN PATENT DOCUMENTS

| CN | 105104703 A | 12/2015 |
| CN | 105104704 A | 12/2015 |

(Continued)

OTHER PUBLICATIONS

Machine translation of CN112244089 to Cheng, publication date Jan. 22, 2021. pp. 1-19. (Year: 2021).*

(Continued)

*Primary Examiner* — Jenna A Watts
(74) *Attorney, Agent, or Firm* — IPRO, PLLC

(57) ABSTRACT

The present disclosure provides a method for preparing concentrated high-protein yogurt before fermentation, belonging to the technical field of dairy product processing. The method for preparing the concentrated high-protein yogurt before fermentation in the present disclosure includes: enabling a high-protein base material with a decalcification rate of 21.8-44.2% to be subjected to heat treatment at pH of 6.6-6.8 and temperature of 80-95° C. for 10-30 min; after that, cooling to 40-45° C., adding 0.05-0.2% (w/w) of a starter, and carrying out high end-point pH fermentation at 40-45° C. until the pH drops to 4.8-5.0; and then, performing low-temperature after-ripening to obtain the high-protein yogurt. Compared with high-protein yogurt prepared by a whey discharge process after fermentation, the concentrated high-protein yogurt prepared according to the present disclosure has similar or better soft texture, delicate taste, water holding capacity and digestibility, and is higher in calcium content.

5 Claims, 3 Drawing Sheets

(52) U.S. Cl.
CPC ... *A23V 2400/123* (2023.08); *A23V 2400/249* (2023.08)

(56) References Cited

FOREIGN PATENT DOCUMENTS

| | | | |
|---|---|---|---|
| CN | 105325541 A | 2/2016 | |
| CN | 108887381 A | 11/2018 | |
| CN | 109924257 A | 6/2019 | |
| CN | 110200069 A | 9/2019 | |
| CN | 112244089 B * | 1/2021 | ............... A23C 3/03 |
| CN | 114190434 A | 3/2022 | |

OTHER PUBLICATIONS

Hu Jinhua et al., "Ion Exchange Decalcification of Milk Protein Concentrate and Its Effect on Casein Micelles", Food and Fermentation Industries, vol. 42, Issue 09 Dec. 31, 2016.

Liu Dasong et al., "Effect of Decalcification on Improving the Solubility of Milk Protein Concentrate", Food and Fermentation Industries, vol. 43, Issue 05 Dec. 31, 2017.

* cited by examiner

METHOD FOR PREPARING CONCENTRATED HIGH-PROTEIN YOGURT BEFORE FERMENTATION

TECHNICAL FIELD

The present disclosure relates to a method for preparing concentrated high-protein yogurt before fermentation, belonging to the technical field of dairy product processing.

BACKGROUND

Yogurt is one of the most popular fermented dairy products in the world for its flavor, nutrition and function. High-protein yogurt refers to yogurt with a protein content of 5.6% or above, which is rich in high-quality protein and organic calcium. In recent years, it has become popular in sports and fitness, weight control and the elderly.

The traditional process for increasing the protein content of yogurt is centrifugal concentration after fermentation, which will produce a large amount of acidic whey. On the one hand, it will lead to the loss of nutrients and flavor substances such as calcium and fermentation metabolites. On the other hand, the treatment of whey will lead to an increase in production costs.

Increasing the protein content of yogurt can also be achieved by adding milk powder into a base material (such as skim milk and whole milk) before fermentation, which avoids the production of acidic whey. The commonly used milk powder includes skim milk powder, whey protein and caseinate, which will cause the lactose content of the base material to be too high, lead to an insufficient calcium ion content, or result in an uncoordinated proportion of whey protein and casein, thereby adversely affecting the taste and texture of yogurt. The addition of skim milk powder to the base material will introduce too much lactose, which will lead to excessive acidification of yogurt during after-ripening and storage, and even lead to a too high osmotic pressure of the base material to inhibit the proliferation and acid production of lactic acid bacteria during fermentation; and the addition of whey protein will increase the proportion of whey protein and casein, which has an adverse effect on the formation of a yogurt gel network structure and further increases the whey discharge from yogurt. The addition of sodium caseinate will lower the content of calcium ions, will also adversely affect the formation of the yogurt gel network structure, and thus has an adverse effect on the nutritional value of yogurt. Simultaneously adding a variety of protein raw materials can, to some extent, solve the quality problems caused by adding a single commonly used raw material, but it also increases the related costs such as raw material quality control cost and yogurt production cost (for example, see CN 109924257 A).

Milk protein concentrate (MPC) and micellar casein concentrate (MCC) are prepared by filtering separation through a membrane, where casein exists in its natural micelle structure, bound to a large amount of calcium ions. Casein micelles are the basic structural units and thus play an important role in promoting the formation of a yogurt gel network structure. MPC and MCC also have the characteristics of high protein, low lactose and low fat contents, thus having better application prospects in the development of high-protein yogurt. In addition, MPC contains both casein and whey protein at the same ratio as in milk, so the addition of MPC to milk will not change the ratio of casein and whey protein.

When milk powder is added to a base material until the protein content reaches 7% or above before fermentation, it is easy to cause quality defects such as hard texture and rough particles of yogurt, which is not conducive to digestion and absorption, thereby reducing consumers' acceptance. It will also make the buffer capacity of the base material too high, resulting in a too long fermentation time for yogurt and reducing production efficiency. High speed mixing after fermentation will destroy the gel network structure, which can make the yogurt present delicate taste, but in the process of after-ripening and storage, the gel network structure will be reconstructed, resulting in yogurt quality deterioration such as excessive whey discharge and texture overhardening.

At present, there are documents disclosing that MPC and MCC are decalcified to improve their solubility in water, interfacial activities, such as foamability and emulsification, at a two-phase interface, and cohesion in a nutrition bar system. The improvement of these application properties is related to the depolymerization of micelle structures (i.e., the dissociation of casein from micelles) caused by decalcification treatment. However, a high-protein yogurt system is lower in pH, and its fermentation time, texture hardness, particle size and water holding capacity are more affected by the buffer capacity of the system and the interactions between components, which have no correlation with the solubility, interfacial activities and cohesion of MPC and MCC.

SUMMARY

Technical Problem

To produce high-protein yogurt with a protein content of 7% or above, the traditional process of concentration after fermentation will produce a large amount of acidic whey, resulting in the loss of nutrients and flavor substances such as calcium. The process of adding milk powder to a base material before fermentation will easily cause quality defects such as hard texture and rough particles of yogurt, which is not conducive to digestion and absorption and will also make the fermentation time of the yogurt too long.

The technical problem to be solved by the present disclosure is to provide a method for preparing concentrated high-protein yogurt before fermentation, which can effectively reduce the hardness, graininess, and fermentation time of the yogurt when the protein content reaches 7% or above, and does not discharge acidic whey, so that the yogurt is higher in calcium content, better in water holding capacity and better in digestibility.

Technical Solutions

In order to solve the above problem, according to the present disclosure, MPC and MCC are redissolved in skim milk or water before fermentation to prepare a high-protein base material, and the base material is moderately decalcified, or MPC and MCC are decalcified before fermentation and then redissolved in skim milk or water to prepare a moderately decalcified high-protein base material, thereby weakening the aggregation between casein micelles induced by calcium ions during the gelation of the base material; and therefore, yogurt with softer texture, smaller particles and better digestibility is formed, the buffer capacity of the base material is reduced, and the fermentation time is shortened. A starter is added into the base material for high end-point pH fermentation, which further shortens the fermentation time, and increases the net negative charge of casein during the gelation of the base material, so that the aggregation between casein micelles is inhibited, a synergistic effect is achieved between the starter and moderate decalcification, and the yogurt with softer texture, smaller particles and better digestibility is formed. Compared with the high-protein yogurt prepared by the whey discharge process after fermentation, the high-protein yogurt prepared according to the present disclosure has similar or better soft texture, delicate taste, water holding capacity and digestibility, is higher in calcium content, and does not require additional equipment, without acidic whey being discharged.

The first object of the present disclosure is to provide a method for preparing concentrated high-protein yogurt before fermentation, including the following steps:

enabling a high-protein base material with a decalcification rate of 21.8-44.2% to be subjected to heat treatment at pH of 6.6-6.8 and temperature of 80-95° C. for 10-30 minutes; after that, cooling to 40-45° C., adding 0.05-0.2% % (w/w) of a starter, and carrying out high end-point pH fermentation at 40-45° C. until the pH drops to 4.8-5.0; and then, performing low-temperature after-ripening to obtain the high-protein yogurt.

In one embodiment of the present disclosure, a preparation method of the high-protein base material with a decalcification rate of 21.8-44.2% includes the following steps:

enabling an MPC or MCC concentrate to be subject to decalcification treatment and spray-drying to obtain decalcified MPC or MCC powder, and then redissolving the obtained powder in skim milk or water to obtain the high-protein base material with a decalcification rate of 21.8-44.2%;

or spray-drying an MPC or MCC concentrate to obtain MPC or MCC powder, and then redissolving the obtained powder in skim milk or water for decalcification treatment to obtain the high-protein base material with a decalcification rate of 21.8-44.2%.

In one embodiment of the present disclosure, according to the preparation method of the high-protein base material with a decalcification rate of 21.8-44.2%, the decalcification rate of the decalcified MPC or MCC powder redissolved in skim milk is 36.6-72.1% (skim milk itself contains calcium, and MPC also contains calcium, so when the decalcified MPC is dissolved in the skim milk to prepare the high-protein base material, the decalcification rate of the base material will be different from that of the MPC), and the protein dry basis content of MPC and MCC is 60-85%; and when the decalcified MPC or MCC powder is redissolved in water, the decalcification rate is 21.8-44.2%, and the protein dry basis content of MPC and MCC is 50-60%.

In one embodiment of the present disclosure, according to the preparation method of the high-protein base material with a decalcification rate of 21.8-44.2%, decalcification is performed by using ion exchange resin, where when the decalcified MPC or MCC powder is redissolved in skim milk for decalcification, the addition amount of ion exchange resin is 46.1-115.5 g/100 g of casein, and the protein dry basis content of MPC and MCC is 60-85%; when the decalcified MPC or MCC powder is redissolved in water for decalcification, the addition amount of ion exchange resin is 28.8-60.0 g/100 g of casein, and the protein dry basis content of MPC and MCC is 50-60%; when the decalcified high-protein base material is subjected to decalcification, the addition amount of ion exchange resin is 28.8-60.0 g/100 g of casein; and the ion exchange resin includes Amberlite SR1L Na, having a sulfonic acid functional group, with an exchange capacity being 2.05 eq/L.

In one embodiment of the present disclosure, according to the preparation method of the high-protein base material with a decalcification rate of 21.8-44.2%, the decalcification specifically includes adding ion exchange resin into a diluent of the MPC or MCC concentrate or into the high-protein base material, keeping the mixture at a rotating speed of 200-400 rpm for 2-4 hours, and then filtering with a 150-200-mesh filter bag to remove the resin.

In one embodiment of the present disclosure, according to the preparation method of the high-protein base material with a decalcification rate of 21.8-44.2%, the inlet air temperate and the outlet air temperature during spray-drying are 130-190° C. and 70-90° C., respectively.

In one embodiment of the present disclosure, according to the preparation method of the high-protein base material with a decalcification rate of 21.8-44.2%, redissolving refers to a method for redissolving, which includes the following steps: redissolving until the protein content is 7-15%, stirring for dissolving for 20-40 minutes, then homogenizing in cycles for 2-4 times at 20-30 MPa.

In one embodiment of the present disclosure, according to the preparation method of the high-protein base material with a decalcification rate of 21.8-44.2%, when the decalcified MPC or MCC powder is redissolved in skim milk, the protein dry basis content of MPC and MCC is 60-85%; when the decalcified MPC or MCC powder is redissolved in water, the protein dry basis content of MPC and MCC is 50-60%; when the MPC or MCC powder is redissolved in skim milk, the protein dry basis content of MPC and MCC is 60-85%; when the MPC or MCC powder is redissolved in water, the protein dry basis content of MPC and MCC is 50-60%; and "%" refers to a mass percentage.

In one embodiment of the present disclosure, according to the preparation method of the high-protein base material with a decalcification rate of 21.8-44.2%, a preparation method of the MPC concentrate includes the following steps: taking pasteurized skim milk, carrying out ultrafiltration by using an organic membrane with a molecular weight cut-off of 5-20 kDa, replenishing water into retentate to reach the initial volume of the skim milk, and continuing to perform diafiltration, where the temperature of ultrafiltration and diafiltration is 45-50° C., and the retentate collected is the MPC concentrate; and the concentration ratio of ultrafiltration is controlled to be 2-6, the concentration ratio of diafiltration is controlled to be 2-6, and the protein dry basis content of the MPC concentrate is 50-85%.

In one embodiment of the present disclosure, according to the preparation method of the high-protein base material with a decalcification rate of 21.8-44.2%, a preparation method of the MCC concentrate includes the following steps: taking pasteurized skim milk, carrying out microfiltration by using a ceramic membrane with a pore size of 50-200 nm, replenishing water into retentate to reach the initial volume of the skim milk, and continuing to perform diafiltration, where the temperature of microfiltration and diafiltration is 45-50° C., and the retentate collected is the MCC concentrate; and the concentration ratio of microfiltration is controlled to be 2-6, the concentration ratio of diafiltration is controlled to be 2-6, and the protein dry basis content of the MCC concentrate is 50-85%.

In one embodiment of the present disclosure, the adjustment of pH during heat treatment is performed by using a 1-4 M HCl solution or a 1-4 M NaOH solution.

In one embodiment of the present disclosure, the starter used in the high end-point pH fermentation includes *Lac-* tobacillus bulgaricus and Streptococcus thermophilus, with a viable bacteria count ratio being (2:1)-(1:2).

In one embodiment of the present disclosure, the low-temperature after-ripening in the high end-point pH fermentation is implemented by placing at 0-8° C. for 12-36 hours.

In one embodiment of the present disclosure, there is a synergistic effect between decalcification treatment and high end-point pH fermentation. Specifically, in the cases where the decalcification rate of the high-protein base material reaches 32.9-44.2% and the fermentation end-point pH is 4.9, and the decalcification rate of the high-protein base material reaches 32.9-33.4% and the fermentation end-point pH is 5.0, decalcification treatment and high end-point pH fermentation achieve a synergistic effect in improving the soft texture, delicate taste, and digestibility of the high-protein yogurt.

In one embodiment of the present disclosure, the fermentation time can be shortened by moderate decalcification treatment alone or by high end-point pH fermentation alone, and the fermentation time can be further shortened by the combination of the moderate decalcification treatment and the high end-point pH fermentation.

The second object of the present disclosure is the high-protein yogurt prepared by the method according to the present disclosure.

In one embodiment of the present disclosure, the protein content of the high-protein yogurt is 7-15%, and "%" refers to a mass percentage.

The third object of the present disclosure is to provide a method for synergistically improving the soft texture and delicate taste of the high-protein yogurt, including the following steps:

enabling a high-protein base material with a decalcification rate of 32.9-44.2% to be subjected to heat treatment at pH of 6.6-6.8 and temperature of 80-95° C. for 10-30 minutes; after that, cooling to 40-45° C., adding 0.05-0.2% % (w/w) of a starter, and carrying out high end-point pH fermentation at 40-45° C. until the pH drops to 4.9; and then, performing low-temperature after-ripening;

or enabling a high-protein base material with a decalcification rate of 32.9-33.4% to be subjected to heat treatment at pH of 6.6-6.8 and temperature of 80-95° C. for 10-30 minutes; after that, cooling to 40-45° C., adding 0.05-0.2% % (w/w) of a starter, and carrying out high end-point pH fermentation at 40-45° C. until the pH drops to 5.0; and then, performing low-temperature after-ripening.

Beneficial Effects (1) The present disclosure uses MPC or MCC to increase the protein content of the base material before fermentation for preparation of the concentrated high-protein yogurt, without the need for additional equipment in the existing yogurt production process line, and there is no discharge of acidic whey, thereby better retaining the nutrients and flavor substances of the yogurt.

(2) The combination of moderate decalcification treatment and high end-point pH fermentation adopted in the present disclosure has a synergistic effect in improving the soft texture, delicate taste, and digestibility of the high-protein yogurt.

(3) According to the present disclosure, the fermentation time can be shortened by moderate decalcification treatment alone or by high end-point pH fermentation alone, and the fermentation time can be further shortened by the combination of the moderate decalcification treatment and the high end-point pH fermentation.

(4) Compared with the high-protein yogurt prepared by a whey discharge process after fermentation, the concentrated high-protein yogurt prepared according to the present disclosure has similar or better soft texture, delicate taste, water holding capacity and digestibility, and is higher in calcium content.

DETAILED DESCRIPTION

Figure 1:
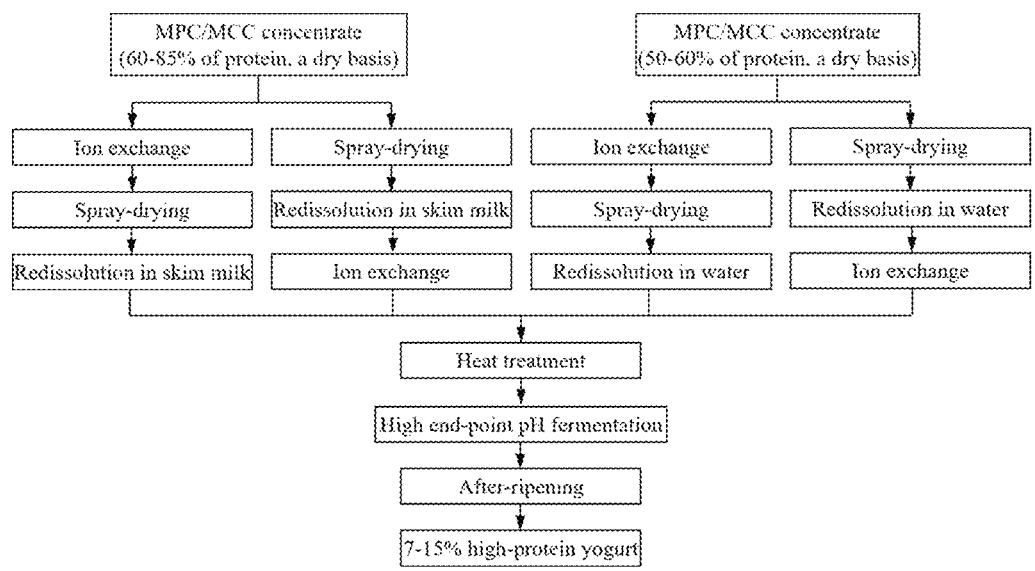
FIG. 1 is a flowchart of the preparation process of high-protein yogurt according to the present disclosure.

Preferred examples of the present disclosure will be described below, and it is to be understood that the examples are for the purpose of better illustrating the present disclosure and are not intended to limit the present disclosure.
Testing Method:
1. Determination of a Protein Content:

The protein content was determined by a Kjeldahl method with a conversion factor of 6.38.
2. Determination of a Lactose Content:

The determination of the lactose content refers to the national standard GB5413.5-2010 National Food Safety Standard—Determination of Lactose and Sucrose in Foods for Infants and Young Children, Milk and Milk Products. A high performance liquid chromatograph e2695 (Waters Corp., Milford, MA, USA), a chromatographic column XBridge Amide (250 mm×4.6 mm), and a differential refraction detector were employed for use.
3. Determination of a Calcium Ion Content:

The determination of the calcium ion content refers to the national standard GB5009.268-2016 National Food Safety Standard—Determination of Multiple elements in Food. An inductively coupled plasma mass spectrometry (ICP-MS) was employed for use.
4. Determination of Yogurt Hardness:

High-protein yogurt was taken and subjected to a hardness test by using a texture analyzer TA-XT2 (Stable Micro System Ltd., Godalming, UK). A probe P/25 (with a diameter of 20 mm) was employed for use, where the pressing speed was 1 mm/s, and the pressing distance was 1 cm.

5. Determination of a Yogurt Particle Size:

High-protein yogurt was taken and stirred for breaking, and water was added into the yogurt for dilution (1:10, w/w). The particle size distribution of the yogurt was measured by a micron particle size analyzer S3500 (Microtrac Inc., Largo, FL, USA), and the refractive index of protein particles was set to 1.57.

6. Observation of the Microstructure of Yogurt:

The microstructure of high-protein yogurt was observed by a laser confocal microscope LSM880 (Carl Zeiss Microscopy GmbH, Jena, Germany), and fluorescein isothiocyanate was used for labeling. The excitation and emission wavelengths were 488 nm and 498-532 nm, respectively.

7. Determination of Water Holding Capacity of Yogurt:

High-protein yogurt was taken and centrifuged at 2000 g for 10 minutes. The weight of the resulting precipitate accounted for a percentage of the total weight of the yogurt, and the percentage was the water holding capacity of the yogurt.

All unspecified percentages (%) in the examples are mass percentages, and the ratio of *L. bulgaricus* and *S. thermophilus* is a viable bacteria count ratio.

Raw Materials Used in the Examples

The preparation steps of MPC were as follows: fresh cow's milk was taken and skimmed (9000 rpm) by a disc centrifuge, and the skim milk was sterilized (72° C., 15 s); the skim milk was enabled to be subjected to ultrafiltration by using an organic membrane with a molecular weight cut-off of 10 kDa, water was replenished into retentate to reach the initial volume of the skim milk, and diafiltration was continued to be performed, where the temperature of ultrafiltration and diafiltration was controlled to be 45-50° C., and the retentate collected was the MPC concentrate; and the concentrate was spray-dried, with the inlet air temperature and the outlet air temperature being respectively 135° C. and 75° C., so that MPC powder was obtained.

The preparation steps of MCC were as follows: the ultrafiltration in the MPC preparation step was changed to microfiltration performed by using a ceramic membrane with a pore size of 100 nm, and the other steps were kept consistent with the preparation steps of MPC, so that MCC concentrate and powder were obtained.

In the preparation steps of MPC and MCC, the concentration ratios of the ultrafiltration/microfiltration stage and diafiltration stage as well as the dry basis contents of protein and lactose in the MPC and the MCC obtained are shown in Table 1.

Example 1 Preparation of High-Protein Yogurt by Redissolving Decalcified MPC85 Powder in Skim Milk Before Fermentation: Effect of a Decalcification Rate of MPC85 Powder in Decalcification Treatment Alone A method for preparing concentrated high-protein yogurt before fermentation includes the following steps:

Preparation of decalcified MPC85 powder: MPC85 concentrate (with a dry basis percentage content of protein being 85.2%) was taken, and water was added for dilution until the total protein content was 5.80%, where the mass ratio of casein to whey protein was 4:1, and the casein content was 4.64%; ion exchange resin Amberlite SR1L Na was added into the diluent, the addition amount of the ion exchange resin was 0 g, 1.09 g, 2.14 g, 3.34 g, 5.36 g or 9.53 g of resin/100 g of a diluent, and correspondingly, the ratio of resin to casein was 0 g, 23.5 g, 46.1 g, 72.0 g, 115.5 g or 205.4 g of resin/100 g of casein; and the obtained mixture was kept at a rotating speed of 300 rpm for 3 hours, and then filtered with a 200-mesh filter bag to remove the resin; and the filtrate was spray-dried, where the inlet air temperature and the outlet air temperature were respectively 135° C. and 75° C., so that decalcified MPC85 powder was obtained.

Preparation of a high-protein base material: decalcified MPC85 powder was taken and redissolved in skim milk until the total protein content in the reconstitution solution was 9.0%, and the reconstitution solution was stirred for dissolving for 30 minutes and then homogenized in cycles for 3 times at 25 mPa, so that the high-protein base material was obtained, where the protein content of the skim milk itself was 3.2%, and the mass ratio of the protein of the skim milk in the reconstitution solution to the protein introduced by the decalcified MPC85 powder was 3.2:5.8.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 4.6; and then, the product was placed at 4° C. for 24 hours for low-temperature after-ripening, so that the high-protein yogurt was obtained.

The addition amount of the ion exchange resin and the decalcification rate of the corresponding MPC85 powder obtained are shown in Table 2. It can be seen from Table 2 that with the increase of the decalcification rate of the MPC85 powder, the decalcification rate of the corresponding base material obtained also gradually increases.

TABLE 1

Preparation process parameters and basic composition of MPC and MCC

| The concentration ratios of ultrafiltration/microfiltration | The concentration ratios of diafiltration | The dry basis contents of protein in the MPC (%) | The dry basis contents of lactose in the MPC (%) | The dry basis contents of protein in the MCC (%) | The dry basis contents of lactose in the MCC (%) |
|---|---|---|---|---|---|
| — | — | 35.6 ± 0.9$^c$ | 54.4 ± 0.6$^a$ | 35.6 ± 0.9$^c$ | 54.4 ± 0.6$^a$ |
| 2.85 | — | 58.0 ± 0.8$^b$ | 31.2 ± 0.7$^b$ | 55.3 ± 0.7$^b$ | 33.2 ± 0.9$^b$ |
| 6 | 6 | 85.2 ± 0.7$^a$ | 4.3 ± 0.3$^c$ | 82.6 ± 0.8$^a$ | 4.9 ± 0.4$^c$ |

Note:
different lowercase letters in the same column indicate significant differences between the corresponding data (P < 0.05); "—" represents the absence of this process step.

TABLE 2

The addition amount of the ion exchange resin and the decalcification rate of the corresponding MPC85 powder obtained

| The casein contents of MPC85 diluent (g/100 g the diluent) | The addition amount of the ion exchange resin (g/100 g the diluent) | The addition amount of the ion exchange resin (g/100 g the casein) | The calcium content of MPC85 diluent (mg/100 g the diluent) | The calcium content of base material (mg/100 g the base material) | The decalcification rate of the MPC85 powder (%) | The decalcification rate of the base material (%) |
|---|---|---|---|---|---|---|
| 4.64 ± 0.05 | 0 | 0 | 154 ± 1$^a$ | 252 ± 1$^a$ | 0 | 0 |
| | 1.09 | 23.5 | 126 ± 3$^b$ | 223 ± 2$^b$ | 18.8 | 11.5 |
| | 2.14 | 46.1 | 99 ± 1$^c$ | 195 ± 2$^c$ | 36.6 | 22.4 |
| | 3.34 | 72.0 | 71 ± 2$^d$ | 169 ± 3$^d$ | 53.9 | 33.0 |
| | 5.36 | 115.5 | 43 ± 1$^e$ | 141 ± 2$^e$ | 72.1 | 44.1 |
| | 9.53 | 205.4 | 16 ± 2$^f$ | 114 ± 1$^f$ | 89.2 | 54.6 |

Note:
different lowercase letters in the same column indicate significant differences between the corresponding data ($P < 0.05$).

Figure 2:
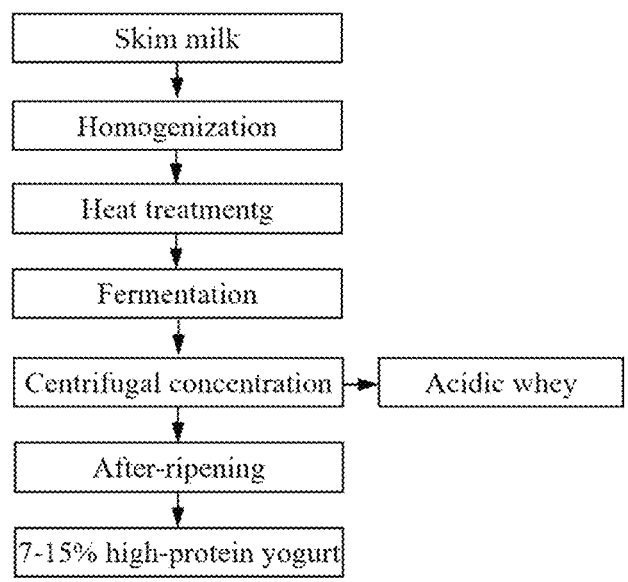
FIG. 2 is a flowchart of the preparation process of high-protein yogurt described in Comparative Example 1.

Comparative Example 1 Preparation of High-Protein Yogurt Through Centrifugal Concentration after Fermentation A preparation method of high-protein yogurt, with a process as shown in FIG. 2, includes the following steps:

Base material preparation: skim milk.

Heat treatment: the pH of a base material was adjusted to 6.7 by using a 2 M NaOH solution, the base material was heated to 95° C. and maintained at the temperature for 10 minutes, and then the base material was cooled to 43° C.

Fermentation: 0.01% (w/w) of a starter (*L. bulgaricus:S. thermophilus*=1:1) was added, and fermentation was carried out at 43° C. for 4 hours until the pH dropped to 4.6; and then, the product was cooled to 4° C. to stop fermentation.

Centrifugal concentration: centrifugation was carried out at 3000 g for 20 minutes, the whey was filtered with a 150-mesh filter bag for concentration until the protein content was 9.0%, and then the product was placed at 4° C. for 24 hours for low-temperature after-ripening, so that the high-protein yogurt was obtained.

The physical and chemical properties of the high-protein yogurt prepared in Example 1 and Comparative Example 1 are shown in Table 3. It can be seen from Table 3 that: in Example 1, with the increase of the decalcification rate of MPC85 powder, the hardness and particle size of the corresponding high-protein yogurt obtained gradually decreases; and when the decalcification rate is 36.6%, the hardness and particle size of the corresponding high-protein yogurt obtained are close to those of the high-protein yogurt in Comparative Example 1.

Figure 3:
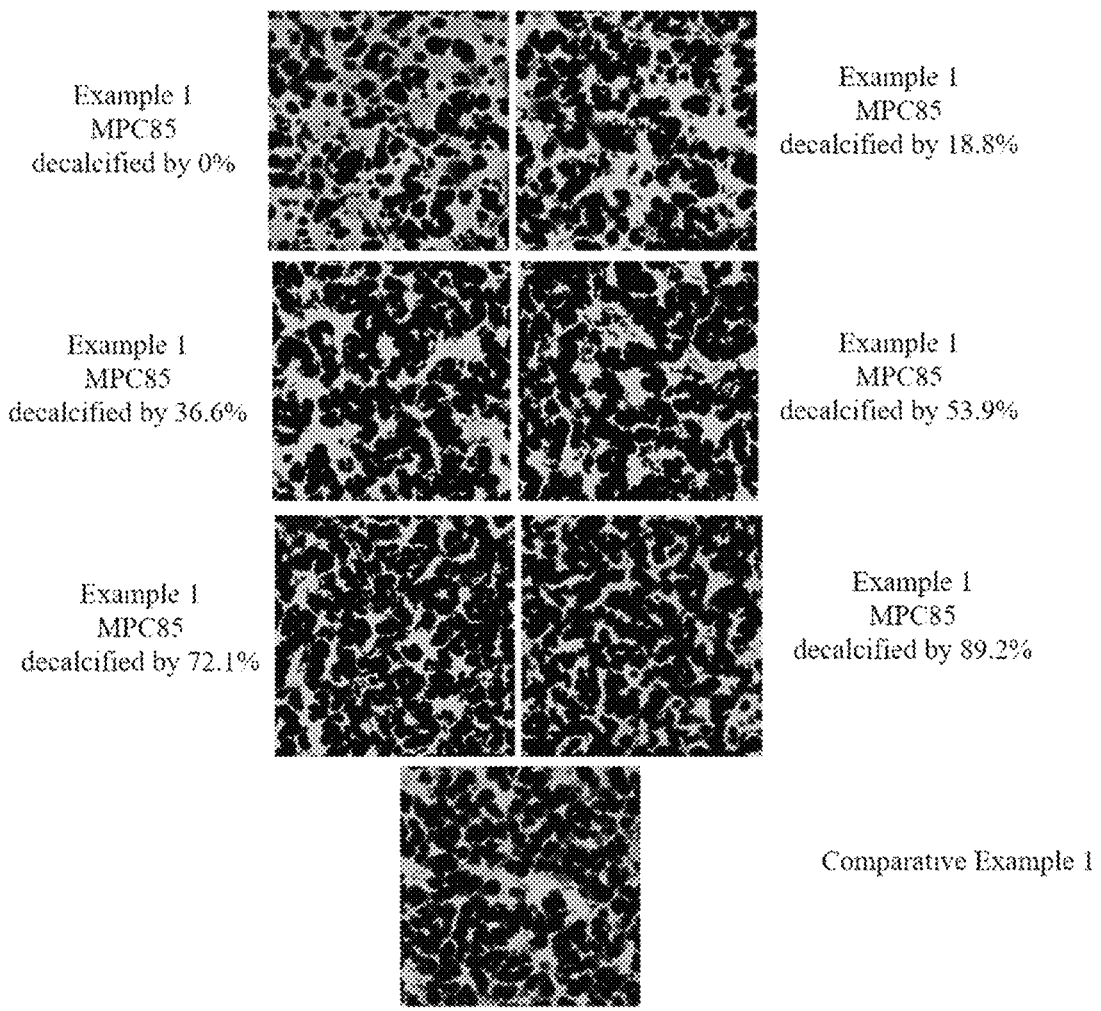
FIG. 3 shows microstructure photos of the high-protein yogurt described in Example 1 and Comparative Example 1.

FIG. 3 shows microstructure diagrams of the high-protein yogurt described in Example 1 and Comparative Example 1. It can be seen from FIG. 3 that with the increase of the decalcification rate of MPC85 powder, the gel network structure of the high-protein yogurt gradually becomes loose; and when the decalcification rate is 36.6%, the gel network structure of the corresponding high-protein yogurt obtained is close to that of the high-protein yogurt in Comparative Example 1. After partial removal of calcium ions from MPC85 powder, the aggregation between casein micelles induced by calcium ions will be directly weakened during the gelation of the base material, and the gel network structure will become loose, forming yogurt with softer texture. After breaking, the yogurt will be smaller in particle size.

It can also be seen from Table 3 that: with the increase of the decalcification rate of MPC85 powder, the water holding capacity of the high-protein yogurt decreases slightly; compared with the high-protein yogurt in Comparative Example 1, the water holding capacity of the high-protein yogurt in Example 1 is higher, which may be due to the partial destruction of the yogurt microstructure caused by centrifugal concentration in Comparative Example 1, thus weakening its binding effect on water; and under the water holding capacity of the high-protein yogurt in Example 1 and Comparative Example 1, no significant whey discharge is observed on the surface layer of the yogurt. With the increase of the decalcification rate of MPC85 powder, the calcium content of the high-protein yogurt gradually decreases. When the decalcification rate is 72.1%, the calcium content of the corresponding high-protein yogurt obtained is still higher than that of the high-protein yogurt in Comparative Example 1, because whey discharge performed in the centrifugal concentration in Comparative Example 1 leads to a large loss of calcium. When the decalcification rate further increases to 89.2%, the calcium content of the corresponding high-protein yogurt obtained is lower than that of the high-protein yogurt in Comparative Example 1. The fermentation time (i.e., the time for pH to decrease to 4.6) of the yogurt in Comparative Example 1 is 4 hours; and as the decalcification rate of MPC85 powder increases, the fermentation time of high-protein yogurt is gradually shortened, because the removal of calcium ions reduces the buffer capacity of the base material, and thus a decrease in pH in the fermentation process is promoted.

To sum up, when high-protein yogurt is prepared by redissolving decalcified MPC85 powder in skim milk before fermentation, the decalcification rate of MPC85 powder may be preferably 36.6-72.1%, and the decalcification rate of the corresponding base material is 22.4-44.1% for the preparation of soft high-protein yogurt, which can shorten the fermentation time; and compared with high-protein yogurt prepared by the whey discharge process after fermentation, the soft high-protein yogurt has similar or better soft texture, delicate taste, and water holding capacity, and is higher in calcium content.

TABLE 3

The physical and chemical properties of high-protein yogurt in Example 1 and Comparative Example 1

| Example | The decalcification rate of the MPC85 powder (%) | The hardness of yogurt (g) | The particle size of yogurt (μm) | The water holding capacity of yogurt (%) | The calcium content of yogurt (mg/100 g) | The fermentation time (hours) |
|---|---|---|---|---|---|---|
| Example 1 | 0 | 102.1 ± 1.3$^a$ | 65.4 ± 0.8$^a$ | 80.1 ± 1.0$^a$ | 252 ± 1$^a$ | 8.0 ± 0.2$^a$ |
| Example 1 | 18.8 | 93.7 ± 1.9$^b$ | 61.1 ± 1.0$^b$ | 79.2 ± 0.7$^a$ | 223 ± 2$^b$ | 7.7 ± 0.1$^{ab}$ |
| Example 1 | 36.6 | 86.4 ± 1.7$^c$ | 57.2 ± 1.6$^c$ | 78.3 ± 0.9$^{ab}$ | 195 ± 2$^c$ | 7.4 ± 0.2$^{bc}$ |
| Example 1 | 53.9 | 80.4 ± 2.1$^d$ | 54.2 ± 0.6$^d$ | 77.2 ± 0.8$^{bc}$ | 169 ± 3$^d$ | 7.1 ± 0.2$^{cd}$ |
| Example 1 | 72.1 | 75.0 ± 1.9$^e$ | 51.3 ± 0.5$^e$ | 76.1 ± 0.9$^c$ | 141 ± 2$^e$ | 6.8 ± 0.1$^{de}$ |
| Example 1 | 89.2 | 65.7 ± 2.5$^f$ | 45.2 ± 1.5$^f$ | 75.3 ± 0.7$^d$ | 114 ± 1$^g$ | 6.5 ± 0.2$^e$ |
| Comparative Example 1 | — | 84.4 ± 1.3$^c$ | 55.7 ± 0.8$^c$ | 69.8 ± 1.1$^e$ | 123 ± 2$^f$ | 4.0 ± 0.2$^f$ |

Note:
different lowercase letters in the same column indicate significant differences between the corresponding data (P < 0.05).

Example 2 Preparation of High-Protein Yogurt by Redissolving MPC85 Powder in Skim Milk Before Fermentation: Effect of a Decalcification Rate of a Base Material in Decalcification Treatment Alone A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%. Decalcification treatment of a high-protein base material: ion exchange resin Amberlite SR1L Na was added into the high-protein base material, the addition amount of the ion exchange resin was 0 g, 1.05 g, 1.68 g, 2.07 g, 3.14 g, 4.29 g or 6.06 g of resin/100 g of a base material, and correspondingly, the ratio of resin to casein was 0 g, 14.6 g, 23.4 g, 28.8 g, 43.6 g, 59.6 g or 84.2 g of resin/100 g of casein; and the obtained mixture was kept at a rotating speed of 300 rpm for 3 hours, and then filtered with a 200-mesh filter bag to remove the resin.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 4.6; and then, the product was placed at 4° C. for 24 hours for low-temperature after-ripening, so that the high-protein yogurt was obtained.

The addition amount of the ion exchange resin and the decalcification rate of the corresponding base material obtained are shown in Table 4.

TABLE 4

The addition amount of the ion exchange resin and decalcification rate of the base material in the Example 2

| The casein content of base material (g/100 g the base material) | The addition amount of the ion exchange resin (g/100 g the base material) | The addition amount of the ion exchange resin (g/100 g the casein) | The calcium content of base material (mg/100 g the base material) | The decalcification rate of the base material (%) |
|---|---|---|---|---|
| 7.20 ± 0.06 | 0 | 0 | 252 ± 2$^a$ | 0 |
| | 1.05 | 14.6 | 224 ± 1$^b$ | 11.1 |
| | 1.68 | 23.4 | 207 ± 2$^c$ | 17.8 |
| | 2.07 | 28.8 | 197 ± 2$^d$ | 21.8 |
| | 3.14 | 43.6 | 169 ± 2$^e$ | 32.9 |
| | 4.29 | 59.6 | 141 ± 3$^f$ | 44.0 |
| | 6.06 | 84.2 | 113 ± 1$^g$ | 54.9 |

Note:
different lowercase letters in the same column indicate significant differences between the corresponding data (P < 0.05).

The physical and chemical properties of the high-protein yogurt prepared in Example 2 and Comparative Example 1 are shown in Table 5. It can be seen from Table 5 that: in Example 2, with the increase of the decalcification rate of a base material, the hardness and particle size of the corresponding high-protein yogurt obtained gradually decreases; and when the decalcification rate is 21.8%, the hardness and particle size of the corresponding high-protein yogurt obtained are close to those of the high-protein yogurt in Comparative Example 1. With the increase of the decalcification rate of the base material, the water holding capacity of the high-protein yogurt decreases slightly; compared with the high-protein yogurt in Comparative Example 1, the water holding capacity of the high-protein yogurt in Example 2 is higher; and under the water holding capacity of the high-protein yogurt in Example 2 and Comparative Example 1, no significant whey discharge is observed on the surface layer of the yogurt. With the increase of the decalcification rate of the base material, the calcium content of the high-protein yogurt gradually decreases. When the decalcification rate is 44.0%, the calcium content of the corresponding high-protein yogurt obtained is still higher than that of the high-protein yogurt in Comparative Example 1. When the decalcification rate further increases to 54.9%, the calcium content of the corresponding high-protein yogurt obtained is lower than that of the high-protein yogurt in Comparative Example 1. As the decalcification rate of the base material increases, the fermentation time of the high-protein yogurt is gradually shortened.

According to the method described in the reference (Brodkorb A, Egger L, Alminger M, et al. INFOGEST static in vitro simulation of gastrointestinal food digestion [J]. Nature protocols, 2019, 14 (4): 991-1014), in vitro simulation of adult gastric digestion was performed on high-protein yogurt, and with the increase of the decalcification rate of a base material, the content of free amino groups released gradually increased. When the decalcification rate was 21.8%, the content of free amino groups increased significantly, and was close to the content of free amino groups released by the high-protein yogurt in Comparative Example 1. When the decalcification rate was 54.9%, the content of free amino groups further increased to a lesser extent. The above results show that the soft high-protein yogurt is more conducive to digestion and absorption.

To sum up, when high-protein yogurt is prepared by redissolving MPC85 powder in skim milk before fermentation, the decalcification rate of the base material may be preferably 21.8-44.0% for the preparation of soft high-protein yogurt, which can shorten the fermentation time; and compared with high-protein yogurt prepared by the whey discharge process after fermentation, the soft high-protein yogurt has similar or better soft texture, delicate taste, water holding capacity, and digestibility, and is higher in calcium content.

It can also be seen from Table 5 that: when the decalcification rate of the base material is increased to 32.9%, the hardness and particle size of the corresponding high-protein yogurt obtained begin to show a significant decrease compared to the high-protein yogurt in Comparative Example 1, and the digestibility thereof is significantly better than that of the high-protein yogurt in Comparative Example 1. Therefore, when soft high-protein yogurt is prepared by redissolving MPC85 powder in skim milk before fermentation, the decalcification rate of the base material is preferably 32.9-44.0%, where the synergistic relationship between the decalcification rate and the fermentation end-point pH in improving the soft texture, delicate taste and digestibility of high-protein yogurt can be explored.

TABLE 5

The physical and chemical properties of high-protein yogurt in Example 2 and Comparative Example 1

| Example | The decalcification rate of the base material (%) | The hardness of yogurt (g) | The particle size of yogurt (μm) | The water holding capacity of yogurt (%) | The calcium content of yogurt (mg/100 g) | The fermentation time (hours) | The free amino content (mM/g protein) |
|---|---|---|---|---|---|---|---|
| Example 2 | 0 | 101.9 ± 1.5$^a$ | 65.3 ± 1.6$^a$ | 80.0 ± 1.1$^a$ | 252 ± 2$^a$ | 8.0 ± 0.1$^a$ | 0.594 ± 0.010$^e$ |
| Example 2 | 11.1 | 93.5 ± 2.0$^b$ | 61.6 ± 1.4$^b$ | 79.3 ± 0.8$^a$ | 224 ± 1$^b$ | 7.7 ± 0.1$^b$ | 0.611 ± 0.011$^{de}$ |
| Example 2 | 17.8 | 91.8 ± 1.0$^b$ | 59.9 ± 0.9$^b$ | 78.8 ± 0.8$^{ab}$ | 207 ± 2$^c$ | 7.6 ± 0.2$^{bc}$ | 0.632 ± 0.022$^d$ |
| Example 2 | 21.8 | 86.1 ± 2.1$^c$ | 57.1 ± 1.7$^c$ | 78.2 ± 0.7$^{ab}$ | 197 ± 2$^d$ | 7.4 ± 0.1$^c$ | 0.715 ± 0.013$^c$ |
| Example 2 | 32.9 | 81.3 ± 1.5$^d$ | 54.0 ± 0.7$^d$ | 77.0 ± 1.0$^{bc}$ | 169 ± 2$^e$ | 7.1 ± 0.2$^d$ | 0.799 ± 0.009$^b$ |
| Example 2 | 44.0 | 77.4 ± 1.5$^e$ | 51.7 ± 1.5$^e$ | 76.2 ± 0.9$^c$ | 141 ± 3$^f$ | 6.8 ± 0.1$^e$ | 0.871 ± 0.023$^a$ |
| Example 2 | 54.9 | 65.4 ± 1.7$^f$ | 45.1 ± 1.0$^f$ | 75.4 ± 0.8$^c$ | 113 ± 1$^h$ | 6.5 ± 0.1$^f$ | 0.882 ± 0.012$^a$ |
| Comparative Example 1 | 0 | 84.4 ± 1.3$^c$ | 55.7 ± 0.8$^c$ | 69.8 ± 1.1$^d$ | 123 ± 2$^g$ | 4.0 ± 0.2$^g$ | 0.701 ± 0.020$^c$ |

Note:
different lowercase letters in the same column indicate significant differences between the corresponding data (P < 0.05).

Example 3 Preparation of High-Protein Yogurt by Redissolving Decalcified MPC58 Powder in Water Before Fermentation: Effect of a Decalcification Rate of MPC58 Powder in Decalcification Treatment Alone A method for preparing high-protein yogurt includes the following steps:

Preparation of decalcified MPC58 powder: MPC58 concentrate (with a dry basis percentage content of protein being 58.0%) was taken, and water was added for dilution until the total protein content was 9.0%, where the mass ratio of casein to whey protein was 4:1, and the casein content was 7.20%; ion exchange resin Amberlite SR1L Na was added into the diluent, the addition amount of the ion exchange resin was 0 g, 1.02 g, 2.10 g, 3.15 g, 4.32 g or 6.10 g of resin/100 g of a diluent, and correspondingly, the ratio of resin to casein was 0 g, 14.2 g, 29.2 g, 43.8 g, 60.0 g or 84.7 g of resin/100 g of casein; and the obtained mixture was kept at a rotating speed of 300 rpm for 3 hours, and then filtered with a 200-mesh filter bag to remove the resin; and the filtrate was spray-dried, where the inlet air temperature and the outlet air temperature were respectively 135° C. and 75° C., so that decalcified MPC58 powder was obtained.

Preparation of a high-protein base material: decalcified MPC58 powder was taken and redissolved in water until the total protein content in the reconstitution solution was 9.0%, and the reconstitution solution was stirred for dissolving for 30 minutes and then homogenized in cycles for 3 times at 25 mPa, so that the high-protein base material was obtained.

Heat treatment: the pH of the high-protein base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 4.6; and then, the product was placed at 4° C. for 24 hours for low-temperature after-ripening, so that the high-protein yogurt was obtained.

The high-protein base material prepared by redissolving MPC85 powder in skim milk in Example 1 has the same total protein content and total lactose content as the high-protein base prepared by redissolving MPC58 powder in water in Example 3, which are 9.0% and 4.8%, respectively.

The addition amount of the ion exchange resin and the decalcification rate of the corresponding MPC58 powder obtained are shown in Table 6.

TABLE 6

The addition amount of the ion exchange resin and decalcification rate of the MPC58 in the Example 3

| The casein contents of MPC58 diluent (g/100 g the diluent) | The addition amount of the ion exchange resin (g/100 g the diluent) | The addition amount of the ion exchange resin (g/100 g the casein) | The calcium content of MPC58 diluent (mg/100 g the diluent) | The calcium content of base material (mg/100 g the base material) | The decalcification rate of the MPC58 powder (%) | The decalcification rate of the base material (%) |
|---|---|---|---|---|---|---|
| 7.20 ± 0.05 | 0 | 0 | 251 ± 1$^a$ | 251 ± 1$^a$ | 0 | 0 |
|  | 1.02 | 14.2 | 224 ± 3$^b$ | 224 ± 3$^b$ | 10.8 | 10.8 |
|  | 2.10 | 29.2 | 195 ± 1$^c$ | 195 ± 1$^c$ | 22.2 | 22.2 |
|  | 3.15 | 43.8 | 168 ± 2$^d$ | 168 ± 2$^d$ | 33.0 | 33.0 |
|  | 4.32 | 60.0 | 140 ± 1$^e$ | 140 ± 1$^e$ | 44.2 | 44.2 |
|  | 6.10 | 84.7 | 112 ± 3$^f$ | 112 ± 3$^f$ | 55.3 | 55.3 |

Note:
different lowercase letters in the same column indicate significant differences between the corresponding data ($P < 0.05$).

The physical and chemical properties of the high-protein yogurt prepared in Example 3 and Comparative Example 1 are shown in Table 7. It can be seen from Table 7 that: in Example 3, with the increase of the decalcification rate of MPC58 powder, the hardness and particle size of the corresponding high-protein yogurt obtained gradually decreases; and when the decalcification rate is 22.2%, the hardness and particle size of the corresponding high-protein yogurt obtained are close to those of the high-protein yogurt in Comparative Example 1. With the increase of the decalcification rate of the MPC58 powder, the water holding capacity of the high-protein yogurt decreases slightly; compared with the high-protein yogurt in Comparative Example 1, the water holding capacity of the high-protein yogurt in Example 3 is higher; and under the water holding capacity of the high-protein yogurt in Example 3 and Comparative Example 1, no significant whey discharge is observed on the surface layer of the yogurt. With the increase of the decalcification rate of the MPC58 powder, the calcium content of the high-protein yogurt gradually decreases. When the decalcification rate is 44.2%, the calcium content of the corresponding high-protein yogurt obtained is still higher than that of the high-protein yogurt in Comparative Example 1. When the decalcification rate further increases to 55.3%, the calcium content of the corresponding high-protein yogurt obtained is lower than that of the high-protein yogurt in Comparative Example 1. As the decalcification rate of the MPC58 powder increases, the fermentation time of the high-protein yogurt is gradually shortened.

To sum up, when high-protein yogurt is prepared by redissolving decalcified MPC58 powder in water before fermentation, the decalcification rate of the MPC58 powder may be preferably 22.2-44.2%, and the decalcification rate of the corresponding base material is 22.2-44.2% for the preparation of soft high-protein yogurt, which can shorten the fermentation time; and compared with high-protein yogurt prepared by the whey discharge process after fermentation, the soft high-protein yogurt has similar or better soft texture, delicate taste, and water holding capacity, and is higher in calcium content.

TABLE 7

The physical and chemical properties of high-protein yogurt in Example 3 and Comparative Example 1

| Example | The decalcification rate of the MPC58 powder (%) | The hardness of yogurt (g) | The particle size of yogurt (μm) | The water holding capacity of yogurt (%) | The calcium content of yogurt (mg/100 g) | The fermentation time (hours) |
|---|---|---|---|---|---|---|
| Example 3 | 0 | 101.8 ± 1.6$^a$ | 65.1 ± 1.0$^a$ | 80.0 ± 0.8$^a$ | 251 ± 1$^a$ | 7.9 ± 0.1$^a$ |
| Example 3 | 10.8 | 93.1 ± 2.1$^b$ | 60.8 ± 1.1$^b$ | 79.2 ± 0.7$^a$ | 224 ± 3$^b$ | 7.6 ± 0.1$^b$ |
| Example 3 | 22.2 | 85.3 ± 1.5$^c$ | 57.2 ± 0.8$^c$ | 78.5 ± 0.7$^{ab}$ | 195 ± 1$^c$ | 7.3 ± 0.1$^c$ |
| Example 3 | 33.0 | 80.9 ± 1.6$^d$ | 54.2 ± 0.6$^d$ | 77.7 ± 0.6$^{bc}$ | 168 ± 2$^d$ | 7.0 ± 0.2$^{cd}$ |
| Example 3 | 44.2 | 75.6 ± 1.4$^e$ | 51.4 ± 0.5$^e$ | 76.4 ± 1.1$^{cd}$ | 140 ± 1$^e$ | 6.7 ± 0.1$^{de}$ |
| Example 3 | 55.3 | 65.7 ± 1.7$^f$ | 44.9 ± 2.0$^f$ | 75.3 ± 0.8$^d$ | 112 ± 3$^g$ | 6.4 ± 0.2$^e$ |
| Comparative Example 1 | — | 84.4 ± 1.3$^c$ | 55.7 ± 0.8$^c$ | 69.8 ± 1.1$^e$ | 123 ± 2$^f$ | 4.0 ± 0.2$^f$ |

Note:
different lowercase letters in the same column indicate significant differences between the corresponding data ($P < 0.05$).

Example 4 Preparation of High-Protein Yogurt by Redissolving MPC58 Powder in Water Before Fermentation: Effect of a Decalcification Rate of a Base Material in Decalcification Treatment Alone A method for preparing high-protein yogurt includes the following steps:

Preparation of a high-protein base material: MPC58 powder (with a dry basis percentage content of protein being 58.0%) was taken and redissolved in water to make the total protein content in the reconstitution solution 9.0%; and the obtained solution was stirred for dissolving for 30 minutes, and then homogenized in cycles for 3 times at 25 mPa to obtain a high-protein base material, where the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 0 g, 1.06 g, 2.09 g, 3.20 g, 4.26 g or 5.98 g of resin/100 g of a base material, and correspondingly, the ratio of resin to casein was 0 g, 14.8 g, 29.0 g, 44.4 g, 59.2 g or 83.1 g of resin/100 g of casein; and the obtained mixture was kept at a rotating speed of 300 rpm for 3 hours, and then filtered with a 200-mesh filter bag to remove the resin.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 4.6; and then, the product was placed at 4° C. for 24 hours for low-temperature after-ripening, so that the high-protein yogurt was obtained.

The addition amount of the ion exchange resin and the decalcification rate of the corresponding base material obtained are shown in Table 8.

The physical and chemical properties of the high-protein yogurt prepared in Example 4 and Comparative Example 1 are shown in Table 9. It can be seen from Table 9 that: in Example 4, with the increase of the decalcification rate of the base material, the hardness and particle size of the corresponding high-protein yogurt obtained gradually decreases; and when the decalcification rate is 22.1%, the hardness and particle size of the corresponding high-protein yogurt obtained are close to those of the high-protein yogurt in Comparative Example 1. With the increase of the decalcification rate of the base material, the water holding capacity of the high-protein yogurt decreases slightly; compared with the high-protein yogurt in Comparative Example 1, the water holding capacity of the high-protein yogurt in Example 4 is higher; and under the water holding capacity of the high-protein yogurt in Example 4 and Comparative Example 1, no significant whey discharge is observed on the surface layer of the yogurt. With the increase of the decalcification rate of the base material, the calcium content of the high-protein yogurt gradually decreases. When the decalcification rate is 43.8%, the calcium content of the corresponding high-protein yogurt obtained is still higher than that of the high-protein yogurt in Comparative Example 1. When the decalcification rate further increases to 54.6%, the calcium content of the corresponding high-protein yogurt obtained is lower than that of the high-protein yogurt in Comparative Example 1. As the decalcification rate of the base material increases, the fermentation time of the high-protein yogurt is gradually shortened.

To sum up, when high-protein yogurt is prepared by redissolving MPC58 powder in water before fermentation, the decalcification rate of the base material may be preferably 22.1-43.8% for the preparation of soft high-protein yogurt, which can shorten the fermentation time; and compared with high-protein yogurt prepared by the whey discharge process after fermentation, the soft high-protein yogurt has similar or better soft texture, delicate taste, and water holding capacity, and is higher in calcium content.

TABLE 8

The addition amount of the ion exchange resin and decalcification rate of the base material in the Example 4

| The casein content of base material (g/100 g the base material) | The addition amount of the ion exchange resin (g/100 g the base material) | The addition amount of the ion exchange resin (g/100 g the casein) | The calcium content of base material (mg/100 g the base material) | The decalcification rate of the base material (%) |
|---|---|---|---|---|
| 7.20 ± 0.07 | 0 | 0 | 251 ± 3$^a$ | 0 |
|  | 1.06 | 14.8 | 223 ± 2$^b$ | 11.3 |
|  | 2.09 | 29.0 | 196 ± 3$^c$ | 22.1 |
|  | 3.20 | 44.4 | 167 ± 1$^d$ | 33.4 |
|  | 4.26 | 59.2 | 141 ± 1$^e$ | 43.8 |
|  | 5.98 | 83.1 | 114 ± 2$^f$ | 54.6 |

Note:
different lowercase letters in the same column indicate significant differences between the corresponding data ($P < 0.05$).

TABLE 9

The physical and chemical properties of the high-protein yogurt prepared in Example 4 and Comparative Example 1

| Example | The decalcification rate of the base material (%) | The hardness of yogurt (g) | The particle size of yogurt (μm) | The water holding capacity of yogurt (%) | The calcium content of yogurt (mg/100 g) | The fermentation time (hours) |
|---|---|---|---|---|---|---|
| Example 4 | 0 | 101.8 ± 1.2$^a$ | 65.3 ± 0.7$^a$ | 80.1 ± 0.7$^a$ | 251 ± 3$^a$ | 7.9 ± 0.1$^a$ |
| Example 4 | 11.3 | 93.5 ± 1.7$^b$ | 61.5 ± 1.1$^b$ | 79.3 ± 0.6$^{ab}$ | 223 ± 2$^b$ | 7.6 ± 0.1$^b$ |
| Example 4 | 22.1 | 86.0 ± 2.1$^c$ | 56.9 ± 0.8$^c$ | 78.3 ± 1.0$^{bc}$ | 196 ± 3$^c$ | 7.3 ± 0.1$^c$ |
| Example 4 | 33.4 | 81.5 ± 1.5$^a$ | 54.0 ± 0.8$^d$ | 77.2 ± 1.1$^{cd}$ | 167 ± 1$^d$ | 7.0 ± 0.2 |
| Example 4 | 43.8 | 77.6 ± 1.9$^e$ | 51.8 ± 1.5$^e$ | 76.4 ± 0.8$^{de}$ | 141 ± 1$^e$ | 6.7 ± 0.1$^d$ |
| Example 4 | 54.6 | 65.1 ± 1.3$^f$ | 45.3 ± 0.7$^f$ | 75.3 ± 1.0$^e$ | 114 ± 2$^g$ | 6.4 ± 0.1$^e$ |
| Comparative Example 1 | 0 | 84.4 ± 1.3$^c$ | 55.7 ± 0.8$^c$ | 69.8 ± 1.1$^f$ | 123 ± 2$^f$ | 4.0 ± 0.2$^f$ |

Note:
different lowercase letters in the same column indicate significant differences between the corresponding data (P < 0.05).

Example 5 Preparation of High-Protein Yogurt by Redissolving MPC85 Powder in Skim Milk Before Fermentation: Effect of pH in Combination of Moderate Decalcification Treatment of a Base Material and High End-Point pH Fermentation A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 3.14 g of resin/100 g of a base material, and correspondingly, the ratio of resin to casein was 43.6 g of resin/100 g of casein; the obtained mixture was kept at a rotating speed of 300 rpm for 3 hours, and then filtered with a 200-mesh filter bag to remove the resin; and the decalcification rate of the base material was 32.9%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (L. bulgaricus:S. thermophilus=1:1) was added, and fermentation was carried out at 43° C. until the pH dropped to 4.6, 4.7, 4.8, 4.9, 5.0 or 5.1; and then, the product was placed at 4° C. for 24 hours for low-temperature after-ripening, so that the high-protein yogurt was obtained.

The physical and chemical properties of the high-protein yogurt prepared in Examples 2 and 5 and Comparative Example 1 are shown in Table 10. It can be seen from Table 10 that: in Example 5, with the increase of the fermentation end-point pH, the hardness, particle size and water holding capacity of the corresponding high-protein yogurt obtained gradually decreases; and when the fermentation end-point pH is 4.8, the hardness and particle size of the corresponding high-protein yogurt obtained decrease significantly, and the water holding capacity thereof is close to that of the high-protein yogurt in Comparative Example 1. When the fermentation end-point pH is 5.1, the water holding capacity of the corresponding high-protein yogurt obtained decreases significantly, and a large amount of whey is discharged onto the surface layer of the yogurt, indicating that the water holding capacity of the yogurt is greatly affected by the fermentation end-point pH. The isoelectric point of casein is 4.6. With the increase of the fermentation end-point pH, the net negative charge carried by casein gradually increases, which inhibits the aggregation between casein micelles, makes the gel network structure become loose, and thus reduces the density of the gel network structure, thus forming yogurt with softer texture and lower water holding capacity. After breaking, the particle size of the yogurt is smaller. The calcium content of the high-protein yogurt in Example 5 is still higher than that of the high-protein yogurt in Comparative Example 1. Compared with the high-protein yogurt in Example 2 (the base material was not decalcified, with the common pH of 4.6 at a fermentation end-point being adopted), the fermentation time of the high-protein yogurt in Example 5 (i.e., the time for the pH to decrease to the end-point pH) is shortened, and the extent to which the fermentation time is shortened gradually increases with the increase of the fermentation end-point pH.

To sum up, when high-protein yogurt is prepared by redissolving MPC85 powder in skim milk before fermentation, a combination of moderate decalcification of the base material and high end-point pH fermentation may be employed, and the fermentation end-point pH may be preferably 4.8-5.0 for the preparation of soft high-protein yogurt, which can shorten the fermentation time. Furthermore, compared with high-protein yogurt prepared by the whey discharge process after fermentation, the soft high-protein yogurt has better soft texture and delicate taste as well as similar water holding capacity, and is higher in calcium content. In addition, increasing the fermentation end-point pH to 4.8-5.0, combined with the decalcification treatment of the base material, can further shorten the fermentation time of high-protein yogurt.

TABLE 10

The physical and chemical properties of the high-protein yogurt prepared in Examples 2 and 5 and Comparative Example 1

| Example | The decalcification rate of the base material (%) | The fermentation end-point pH | The hardness of yogurt (g) | The particle size of yogurt (μm) | The water holding capacity of yogurt (%) | The calcium content of yogurt (mg/100 g) | The fermentation time (hours) |
|---|---|---|---|---|---|---|---|
| Example 2 | 0 | 4.6 | 101.9 ± 1.5$^a$ | 65.3 ± 1.6$^a$ | 80.0 ± 1.1$^a$ | 252 ± 2$^a$ | 8.0 ± 0.1$^a$ |
| Example 5 | 32.9 | 4.6 | 81.3 ± 1.5$^c$ | 54.0 ± 0.7$^{bc}$ | 77.0 ± 1.0$^b$ | 169 ± 1$^b$ | 7.1 ± 0.2$^b$ |
| Example 5 | 32.9 | 4.7 | 80.2 ± 2.0$^c$ | 53.3 ± 0.9$^{cd}$ | 74.1 ± 1.2$^c$ | 169 ± 2$^b$ | 6.6 ± 0.1$^c$ |
| Example 5 | 32.9 | 4.8 | 75.7 ± 1.7$^d$ | 51.6 ± 1.1$^d$ | 71.8 ± 1.0$^d$ | 169 ± 2$^b$ | 6.1 ± 0.2$^d$ |
| Example 5 | 32.9 | 4.9 | 72.8 ± 1.8$^e$ | 47.6 ± 1.5$^e$ | 70.1 ± 0.7$^d$ | 169 ± 1$^b$ | 5.7 ± 0.1$^e$ |
| Example 5 | 32.9 | 5.0 | 69.6 ± 1.5$^e$ | 45.6 ± 1.2$^e$ | 68.4 ± 0.8$^e$ | 169 ± 1$^b$ | 5.3 ± 0.1$^f$ |
| Example 5 | 32.9 | 5.1 | 61.9 ± 1.0$^f$ | 42.2 ± 1.0$^f$ | 53.3 ± 1.1$^f$ | 169 ± 1$^b$ | 5.0 ± 0.2$^f$ |
| Comparative Example 1 | 0 | 4.6 | 84.4 ± 1.3$^b$ | 55.7 ± 0.8$^b$ | 69.8 ± 1.1$^{de}$ | 123 ± 2$^c$ | 4.0 ± 0.2$^g$ |

Note:
different lowercase letters in the same column indicate significant differences between the corresponding data (P < 0.05).

Comparative Example 2 Preparation of High-Protein Yogurt by Redissolving MPC85 Powder in Skim Milk Before Fermentation: Effect of pH in High End-Point pH Fermentation Alone The decalcification treatment of the base material was omitted, and the other steps were the same as those in Example 5, resulting in high-protein yogurt prepared by high end-point pH fermentation alone.

The physical and chemical properties of the high-protein yogurt prepared in Comparative Example 2 are shown in Table 11. It can be seen from Table 11 that: in Comparative Example 2, with the increase of the fermentation end-point pH, the hardness and water holding capacity of the corresponding high-protein yogurt obtained gradually decreases; when the fermentation end-point pH is 4.9, the hardness of the corresponding high-protein yogurt obtained begin to show a significant decrease compared to the high-protein yogurt in Comparative Example 1; when the fermentation end-point pH is 5.0, the water holding capacity of the corresponding high-protein yogurt obtained is close to that of the high-protein yogurt in the Comparative Example 1; and when the fermentation end-point pH is 5.1, the water holding capacity of the corresponding high-protein yogurt obtained decreases significantly, and a large amount of whey is discharged onto the surface layer of the yogurt.

Therefore, when soft high-protein yogurt is prepared by redissolving MPC85 powder in skim milk before fermentation, the fermentation end-point pH may be preferably 4.9-5.0, where the synergistic relationship between the fermentation end-point pH and the decalcification rate of a base material in improving the soft texture and delicate taste of high-protein yogurt can be explored.

TABLE 11

The physical and chemical properties of the high-protein yogurt prepared in Comparative Example 2

| Example | The fermentation end-point pH | The hardness of yogurt (g) | The particle size of yogurt (μm) |
|---|---|---|---|
| Comparative Example 2 | 4.6 | 102.1 ± 1.3$^a$ | 80.1 ± 1.0$^a$ |
| Comparative Example 2 | 4.7 | 94.3 ± 2.1$^b$ | 77.7 ± 1.3$^b$ |
| Comparative Example 2 | 4.8 | 86.5 ± 1.7$^c$ | 74.2 ± 1.2$^c$ |
| Comparative Example 2 | 4.9 | 80.3 ± 1.8$^d$ | 71.1 ± 1.0$^d$ |
| Comparative Example 2 | 5.0 | 75.2 ± 2.1$^e$ | 69.6 ± 1.1$^e$ |
| Comparative Example 2 | 5.1 | 65.1 ± 2.0$^f$ | 57.3 ± 1.0$^f$ |
| Comparative Example 1 | 4.6 | 84.4 ± 1.3$^c$ | 69.8 ± 1.1$^e$ |

Note:
different lowercase letters in the same column indicate significant differences between the corresponding data (P < 0.05).

Example 6 Preparation of High-Protein Yogurt by Redissolving MPC85 Powder in Skim Milk Before Fermentation: Effect of a Combination of a Decalcification Rate (32.9%) of a Base Material and pH (4.9) at a Fermentation End-Point A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 3.14 g of resin/100 g of a base material, and correspondingly, the ratio of resin to casein was 43.6 g of resin/100 g of casein; the obtained mixture was kept at a rotating speed of 300 rpm for 3 hours, and then filtered with a 200-mesh filter bag to remove the resin; and the decalcification rate of the base material was 32.9%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus:S. thermophilus*=1:1) was added, and fermentation was carried out at 43° C. until the pH dropped to 4.9; and then, the product was placed at 4° C. for 24 hours for low-temperature after-ripening, so that the high-protein yogurt was obtained.

Comparative Example 3 Preparation of High-Protein Yogurt by Redissolving MPC85 Powder in Skim Milk Before Fermentation: Effect of a Decalcification Rate (32.9%) of a Base Material Alone The fermentation end-point pH was adjusted to 4.6, and the other steps were the same as those in Example 6, resulting in high-protein yogurt prepared by decalcification treatment of a base material alone.

Comparative Example 4 Preparation of High-Protein Yogurt by Redissolving MPC85 Powder in Skim Milk Before Fermentation: Effect of pH (4.9) at a Fermentation End-Point Alone The decalcification treatment of the base material was omitted, and the other steps were the same as those in Example 6, resulting in high-protein yogurt prepared by high end-point pH fermentation alone.

The physical and chemical properties of the high-protein yogurt prepared in Example 6 and Comparative Examples 1, 3 and 4 are shown in Table 12. It can be seen from Table 12 that: moderate decalcification treatment alone makes the hardness and particle size of the yogurt reduced by 3.1 g and 1.7 μm, respectively; increasing the fermentation end-point pH alone makes the hardness and particle size of the yogurt reduced by 4.1 g and 3.0 μm, respectively; the combination of moderate decalcification treatment and increasing the fermentation end-point pH reduces the hardness and particle size of the yogurt by 11.6 g and 8.1 μm, respectively, both of which are greater than the sum (i.e., 7.2 g and 4.7 μm) of the effects achieved by moderate decalcification treatment alone and increasing the fermentation end-point pH alone, indicating that moderate decalcification treatment and high end-point pH fermentation have a synergistic effect on improving the soft texture and delicate taste of the high-protein yogurt; and similarly, it is also found that moderate decalcification treatment and high end-point pH fermentation have a synergistic effect on improving the digestibility of the high-protein yogurt; and the water holding capacity of the yogurt is higher after the base material is subjected to moderate decalcification treatment alone; increasing the fermentation end-point pH alone and the combination of moderate decalcification treatment and increasing the fermentation end-point pH enable the water holding capacity of the yogurt to be close to that of the high-protein yogurt in Comparative Example 1; and under the water holding capacity of various high-protein yogurt, no significant whey discharge is observed on the surface layer of the yogurt.

To sum up, when high-protein yogurt is prepared by redissolving MPC85 powder in skim milk before fermentation, a combination of decalcification rate (32.9%) of the base material and the pH (4.9) at a fermentation end-point may be preferably employed for the preparation of soft high-protein yogurt, which achieves a synergistic effect on improving the soft texture, delicate taste, and digestibility of the high-protein yogurt.

TABLE 12

The physical and chemical properties of the high-protein yogurt prepared in Example 6 and Comparative Examples 1, 3 and 4

| Example | The decalcification rate of the base material (%) | The fermentation end-point pH | The hardness of yogurt (g) | The particle size of yogurt (μm) | The water holding capacity of yogurt (%) | The free amino content (mM/g protein) |
|---|---|---|---|---|---|---|
| Example 6 | 32.9 | 4.9 | 72.8 ± 1.8$^c$ | 47.6 ± 1.5$^c$ | 70.1 ± 0.7$^b$ | 0.885 ± 0.010$^a$ |
| Comparative Examples 3 | 32.9 | 4.6 | 81.3 ± 1.5$^b$ | 54.0 ± 0.7$^b$ | 77.0 ± 1.0$^a$ | 0.799 ± 0.009$^b$ |
| Comparative Examples 4 | 0 | 4.9 | 80.3 ± 1.8$^b$ | 52.7 ± 1.7$^b$ | 71.1 ± 1.0$^b$ | 0.749 ± 0.011$^c$ |
| Comparative Examples 1 | 0 | 4.6 | 84.4 ± 1.3$^a$ | 55.7 ± 0.8$^a$ | 69.8 ± 1.1$^b$ | 0.701 ± 0.020$^d$ |

Note:
different lowercase letters in the same column indicate significant differences between the corresponding data ($P < 0.05$).

Example 7 Preparation of High-Protein Yogurt by Redissolving MPC85 Powder in Skim Milk Before Fermentation: Effect of a Combination of a Decalcification Rate (44.0%) of a Base Material and pH (4.9) at a Fermentation End-Point A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 4.29 g of resin/100 g of a base material, and correspondingly, the ratio of resin to casein was 59.6 g of resin/100 g of casein; the obtained mixture was kept at a rotating speed of 300 rpm for 3 hours, and then filtered with a 200-mesh filter bag to remove the resin; and the decalcification rate of the base material was 44.0%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus:S. thermophilus*=1:1) was added, and fermentation was carried out at 43° C. until the pH dropped to 4.9; and then, the product was placed at 4° C. for 24 hours for low-temperature after-ripening, so that the high-protein yogurt was obtained.

Comparative Example 5 Preparation of High-Protein Yogurt by Redissolving MPC85 Powder in Skim Milk Before Fermentation: Effect of a Decalcification Rate (44.0%) of a Base Material Alone The fermentation end-point pH was adjusted to 4.6, and the other steps were the same as those in Example 7, resulting in high-protein yogurt prepared by decalcification treatment of a base material alone.

The physical and chemical properties of the high-protein yogurt prepared in Example 7 and Comparative Examples 1, 4 and 5 are shown in Table 13. It can be seen from Table 13 that: moderate decalcification treatment alone makes the hardness and particle size of the yogurt reduced by 7.0 g and 4.0 μm, respectively; increasing the fermentation end-point pH alone makes the hardness and particle size of the yogurt reduced by 4.1 g and 3.0 μm, respectively; the combination of moderate decalcification treatment and increasing the fermentation end-point pH reduces the hardness and particle size of the yogurt by 14.3 g and 9.6 μm, respectively, both of which are greater than the sum (i.e., 11.1 g and 7.0 μm) of the effects achieved by moderate decalcification treatment alone and increasing the fermentation end-point pH alone, indicating that moderate decalcification treatment and high end-point pH fermentation have a synergistic effect on improving the soft texture and delicate taste of the high-protein yogurt; and similarly, it is also found that moderate decalcification treatment and high end-point pH fermentation have a synergistic effect on improving the digestibility of the high-protein yogurt; and the water holding capacity of the yogurt is higher after the base material is subjected to moderate decalcification treatment alone; increasing the fermentation end-point pH alone and the combination of moderate decalcification treatment and increasing the fermentation end-point pH enable the water holding capacity of the yogurt to be close to that of the high-protein yogurt in Comparative Example 1; and under the water holding capacity of various high-protein yogurt, no significant whey discharge is observed on the surface layer of the yogurt.

To sum up, when high-protein yogurt is prepared by redissolving MPC85 powder in skim milk before fermentation, a combination of decalcification rate (44.0%) of the base material and the pH (4.9) at a fermentation end-point may be preferably employed for the preparation of soft high-protein yogurt, which achieves a synergistic effect on improving the soft texture, delicate taste, and digestibility of the high-protein yogurt.

TABLE 13

The physical and chemical properties of the high-protein yogurt prepared in Example 7 and Comparative Examples 1, 4 and 5

| Example | The decalcification rate of the base material (%) | The fermentation end-point pH | The hardness of yogurt (g) | The particle size of yogurt (μm) | The water holding capacity of yogurt (%) | The free amino content (mM/g protein) |
|---|---|---|---|---|---|---|
| Example 7 | 44.0 | 4.9 | 70.1 ± 1.6$^c$ | 46.1 ± 1.3$^c$ | 69.0 ± 1.2$^b$ | 0.930 ± 0.021$^a$ |
| Comparative Examples 5 | 44.0 | 4.6 | 77.4 ± 1.5$^b$ | 51.7 ± 1.5$^b$ | 76.2 ± 0.9$^a$ | 0.871 ± 0.023$^b$ |
| Comparative Examples 4 | 0 | 4.9 | 80.3 ± 1.8$^b$ | 52.7 ± 1.7$^b$ | 71.1 ± 1.0$^b$ | 0.749 ± 0.011$^c$ |
| Comparative Examples 1 | 0 | 4.6 | 84.4 ± 1.3$^a$ | 55.7 ± 0.8$^a$ | 69.8 ± 1.1$^b$ | 0.701 ± 0.020$^d$ |

Note:
different lowercase letters in the same column indicate significant differences between the corresponding data (P < 0.05).

Example 8 Preparation of High-Protein Yogurt by Redissolving MPC85 Powder in Skim Milk Before Fermentation: Effect of a Combination of a Decalcification Rate (32.9%) of a Base Material and pH (5.0) at a Fermentation End-Point A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 3.14 g of resin/100 g of a base material, and correspondingly, the ratio of resin to casein was 43.6 g of resin/100 g of casein; the obtained mixture was kept at a rotating speed of 300 rpm for 3 hours, and then filtered with a 200-mesh filter bag to remove the resin; and the decalcification rate of the base material was 32.9%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus:S. thermophilus*=1:1) was added, and fermentation was carried out at 43° C. until the pH dropped to 5.0; and then, the product was placed at 4° C. for 24 hours for low-temperature after-ripening, so that the high-protein yogurt was obtained.

Comparative Example 6 Preparation of High-Protein Yogurt by Redissolving MPC85 Powder in Skim Milk Before Fermentation: Effect of pH (5.0) at a Fermentation End-Point Alone The decalcification treatment of the base material was omitted, and the other steps were the same as those in Example 8, resulting in high-protein yogurt prepared by high end-point pH fermentation alone.

the water holding capacity of the yogurt is higher after the base material is subjected to moderate decalcification treatment alone; increasing the fermentation end-point pH alone and the combination of moderate decalcification treatment and increasing the fermentation end-point pH enable the water holding capacity of the yogurt to be close to that of the high-protein yogurt in Comparative Example 1; and under the water holding capacity of various high-protein yogurt, no significant whey discharge is observed on the surface layer of the yogurt.

To sum up, when high-protein yogurt is prepared by redissolving MPC85 powder in skim milk before fermentation, a combination of decalcification rate (32.9%) of the base material and the pH (5.0) at a fermentation end-point may be preferably employed for the preparation of soft high-protein yogurt, which achieves a synergistic effect on improving the soft texture, delicate taste, and digestibility of the high-protein yogurt.

TABLE 14

The physical and chemical properties of the high-protein yogurt prepared in Example 8 and Comparative Examples 1, 3 and 6

| Example | The decalcification rate of the base material (%) | The fermentation end-point pH | The hardness of yogurt (g) | The particle size of yogurt (μm) | The water holding capacity of yogurt (%) | The free amino content (mM/g protein) |
|---|---|---|---|---|---|---|
| Example 8 | 32.9 | 5.0 | 69.6 ± 1.5$^d$ | 45.6 ± 1.2$^d$ | 68.4 ± 0.8$^b$ | 0.898 ± 0.010$^a$ |
| Comparative Example 3 | 32.9 | 4.6 | 81.3 ± 1.5$^b$ | 54.0 ± 0.7$^b$ | 77.0 ± 1.0$^a$ | 0.799 ± 0.009$^b$ |
| Comparative Example 6 | 0 | 5.0 | 75.2 ± 2.1$^c$ | 48.7 ± 1.2$^c$ | 69.6 ± 1.1$^b$ | 0.762 ± 0.010$^c$ |
| Comparative Example 1 | 0 | 4.6 | 84.4 ± 1.3$^a$ | 55.7 ± 0.8$^a$ | 69.8 ± 1.1$^b$ | 0.701 ± 0.020$^d$ |

Note:
different lowercase letters in the same column indicate significant differences between the corresponding data (P < 0.05).

The physical and chemical properties of the high-protein yogurt prepared in Example 8 and Comparative Examples 1, 3 and 6 are shown in Table 14. It can be seen from Table 14 that: moderate decalcification treatment alone makes the hardness and particle size of the yogurt reduced by 3.1 g and 1.7 μm, respectively; increasing the fermentation end-point pH alone makes the hardness and particle size of the yogurt reduced by 9.2 g and 7.0 μm, respectively; the combination of moderate decalcification treatment and increasing the fermentation end-point pH reduces the hardness and particle size of the yogurt by 14.8 g and 10.1 μm, respectively, both of which are greater than the sum (i.e., 12.3 g and 8.7 μm) of the effects achieved by moderate decalcification treatment alone and increasing the fermentation end-point pH alone, indicating that moderate decalcification treatment and high end-point pH fermentation have a synergistic effect on improving the soft texture and delicate taste of the high-protein yogurt; and similarly, it is also found that moderate decalcification treatment and high end-point pH fermentation have a synergistic effect on improving the digestibility of the high-protein yogurt; and Comparative Example 7 Preparation of High-Protein Yogurt by Redissolving MPC85 Powder in Skim Milk Before Fermentation: Effect of a Combination of a Decalcification Rate (44.0%) of a Base Material and pH (5.0) at a Fermentation End-Point A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Decalcification treatment of a high-protein base material: ion exchange resin Amberlite SR1L Na was added into the high-protein base material, the addition amount of the ion exchange resin was 4.29 g of resin/100 g of a base material, and correspondingly, the ratio of resin to casein was 59.6 g of resin/100 g of casein; the obtained mixture was kept at a rotating speed of 300 rpm for 3 hours, and then filtered with a 200-mesh filter bag to remove the resin; and the decalcification rate of the base material was 44.0%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 5.0; and then, the product was placed at 4° C. for 24 hours for low-temperature after-ripening, so that the high-protein yogurt was obtained.

The physical and chemical properties of the high-protein yogurt prepared in Comparative Examples 1, 5, 6 and 7 are shown in Table 15. It can be seen from Table 15 that: moderate decalcification treatment alone makes the hardness and particle size of the yogurt reduced by 7.0 g and 4.0 μm, respectively; increasing the fermentation end-point pH alone makes the hardness and particle size of the yogurt reduced by 9.2 g and 7.0 μm, respectively; the combination of moderate decalcification treatment and increasing the fermentation end-point pH reduces the hardness and particle size of the yogurt by 15.6 g and 10.8 μm, respectively, both of which are less than the sum (i.e., 16.2 g and 11.0 μm) of the effects achieved by moderate decalcification treatment alone and increasing the fermentation end-point pH alone, indicating that decalcification rate (44.0%) of a base material and pH (5.0) at a fermentation end-point have no synergistic effect on improving the soft texture and delicate taste of the high-protein yogurt; and similarly, it is also found that decalcification rate (44.0%) of a base material and pH (5.0) at a fermentation end-point have no synergistic effect on improving the digestibility of the high-protein yogurt; and the water holding capacity of the yogurt is higher after the base material is subjected to moderate decalcification treatment alone; increasing the fermentation end-point pH alone enables the water holding capacity of the yogurt to be close to that of the high-protein yogurt in Comparative Example 1; the combination of moderate decalcification treatment and increasing the fermentation end-point pH makes the water holding capacity of the yogurt slightly lower than that of the high-protein yogurt in the comparative examples; and yet no significant whey discharge is observed on the surface layer of the yogurt.

Through comprehensive analysis, the results of Examples 6, 7, 8 and Comparative Example 7 show that when the soft high-protein yogurt is prepared by redissolving MPC85 powder in skim milk before fermentation, in the cases where the decalcification rate of the high-protein base material reaches 32.9-44.0% and the fermentation end-point pH is 4.9, and the decalcification rate of the high-protein base material reaches 32.9% and the fermentation end-point pH is 5.0, the decalcification rate and the fermentation end-point pH achieve a synergistic effect on improving the soft texture, delicate taste, and digestibility of the high-protein yogurt.

After a large number of experiments, it is found that in the cases where the decalcification rate of the high-protein base material reaches 32.9-44.2% and the fermentation end-point pH is 4.9, and the decalcification rate of the high-protein base material reaches 32.9-33.4% and the fermentation end-point pH is 5.0, the decalcification rate and the fermentation end-point pH also achieve the synergistic effect on improving the soft texture, delicate taste, and digestibility of the high-protein yogurt.

Comparative Example 8 Preparation of High-Protein Yogurt by High-Speed Stirring after Fermentation A method for preparing high-protein yogurt includes the following steps:

Preparation of a high-protein base material: MPC85 powder (with a dry basis percentage content of protein being 85.2%) was taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution to the protein introduced by the MPC85 powder was 3.2:5.8, the mass ratio of casein to whey protein in the reconstitution solution was 4:1, and the content of casein was 7.20%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried out at 43° C. until the pH dropped to 4.6.

High-speed stirring: the yogurt was cooled to 15° C., and stirred at a rotating speed of 0 rpm, 3000 rpm or 6000 rpm for 3 minutes; and then, the product was placed at 4° C. for

TABLE 15

The physical and chemical properties of the high-protein yogurt prepared in Comparative Examples 1, 5, 6 and 7

| Example | The decalcification rate of the base material (%) | The fermentation end-point pH | The hardness of yogurt (g) | The particle size of yogurt (μm) | The water holding capacity of yogurt (%) | The free amino content (mM/g protein) |
|---|---|---|---|---|---|---|
| Comparative Examples 7 | 44.0 | 5.0 | $68.8 \pm 1.4^c$ | $44.9 \pm 1.0^d$ | $65.7 \pm 0.8^c$ | $0.932 \pm 0.011^a$ |
| Comparative Examples 5 | 44.0 | 4.6 | $77.4 \pm 1.5^b$ | $51.7 \pm 1.5^b$ | $76.2 \pm 0.9^a$ | $0.871 \pm 0.023^b$ |
| Comparative Examples 6 | 0 | 5.0 | $75.2 \pm 2.1^b$ | $48.7 \pm 1.2^c$ | $69.6 \pm 1.1^b$ | $0.762 \pm 0.010^c$ |
| Comparative Examples 1 | 0 | 4.6 | $84.4 \pm 1.3^a$ | $55.7 \pm 0.8^a$ | $69.8 \pm 1.1^b$ | $0.701 \pm 0.020^d$ |

Note:
different lowercase letters in the same column indicate significant differences between the corresponding data ($P < 0.05$).

24 hours for low-temperature after-ripening, so that the high-protein yogurt was obtained.

The physical and chemical properties of the high-protein yogurt prepared in Example 8 and Comparative Example 8 are shown in Table 16.

It can be seen from Table 16 that: in Comparative Example 8, after the base material is fermented and stirred at 3000 rpm and 6000 rpm, the hardness and particle size of the yogurt are reduced, but still are significantly higher than those of the yogurt in Example 8, which may be caused by the higher calcium content of the yogurt in Comparative Example 8. In Comparative Example 8, after stirring, the water holding capacity of the yogurt significantly decreases, and a large amount of whey is discharged onto the surface layer of the yogurt, which may be due to the destruction of the gel network structure of the yogurt by high-speed stirring. Compared with Comparative Example 8, the high-protein yogurt in Example 8 has better soft texture, delicate taste and water holding capacity.

out at 43° C. until the pH dropped to 4.6; and then, the product was placed at 4° C. for 24 hours for low-temperature after-ripening, so that the high-protein yogurt was obtained.

The physical and chemical properties of the high-protein yogurt prepared in Example 8 and Comparative Example 9 are shown in Table 17. It can be seen from Table 17 that: compared with Example 8, the hardness and particle size of the high-protein yogurt in Comparative Example 9 are higher, and the water holding capacity thereof is lower; and a large amount of whey is discharged onto the surface layer of the yogurt, which may be due to the fact that the increase in the proportion of whey protein is not conducive to the formation of the gel network structure of the yogurt, and thus dehydration and condensation are easily caused. Compared with Comparative Example 9, the high-protein yogurt in Example 8 has better soft texture, delicate taste and water holding capacity.

TABLE 16

The physical and chemical properties of the high-protein yogurt prepared in Example 8 and Comparative Example 8

| Example | The decalcification rate of the base material (%) | The fermentation end-point pH | The speed stirring after fermentation (rpm) | The hardness of yogurt (g) | The particle size of yogurt (μm) | The water holding capacity of yogurt (%) |
|---|---|---|---|---|---|---|
| Example 8 | 32.9 | 5.0 | 0 | 69.6 ± 1.5$^c$ | 45.6 ± 1.2$^c$ | 68.4 ± 0.8$^b$ |
| Comparative Example 8 | 0 | 4.6 | 0 | 101.9 ± 1.5$^a$ | 65.3 ± 1.6$^a$ | 80.0 ± 1.1$^a$ |
| Comparative Example 8 | 0 | 4.6 | 3000 | 92.7 ± 1.2$^b$ | 60.9 ± 1.0$^b$ | 60.2 ± 0.7$^c$ |
| Comparative Example 8 | 0 | 4.6 | 6000 | 91.6 ± 1.3$^b$ | 59.8 ± 0.9$^b$ | 53.2 ± 1.2$^d$ |

Note:
different lowercase letters in the same column indicate significant differences between the corresponding data (P < 0.05).

Comparative Example 9 Preparation of High-Protein Yogurt by Redissolving MPC85 Powder and Whey Protein Isolate Powder in Skim Milk Before Fermentation A method for preparing high-protein yogurt includes the following steps:

Preparation of a high-protein base material: MPC85 powder (with a dry basis percentage content of protein being 85.2%) and whey protein isolate powder (with a dry basis percentage content of protein being 90.5%) were taken and redissolved in skim milk to make the total protein content in the reconstitution solution 9.0%; and the obtained solution was stirred for dissolving for 30 minutes, and then homogenized in cycles for 3 times at 25 mPa to obtain a high-protein base material, where the protein content of the skim milk itself was 3.2%, the mass ratio of the protein of the skim milk in the reconstitution solution, the protein introduced by the MPC85 powder, and the protein introduced by the whey protein isolate powder was 3.2:4.3:1.5, the mass ratio of casein to whey protein in the reconstitution solution was 2:1, and the content of casein was 6.0%.

Heat treatment: the pH of the base material was adjusted to 6.7 by using a 2 M HCl solution, the base material was heated to 95° C. and maintained at the temperature for 10 minutes, and then the base material was cooled to 43° C.

Fermentation: 0.01% (w/w) of a starter (*L. bulgaricus*:*S. thermophilus*=1:1) was added, and fermentation was carried

TABLE 17

The physical and chemical properties of the high-protein yogurt prepared in Example 8 and Comparative Example 9

| Example | The hardness of yogurt (g) | The particle size of yogurt (μm) | The water holding capacity of yogurt (%) |
|---|---|---|---|
| Example 8 | 69.6 ± 1.5$^b$ | 45.6 ± 1.2$^b$ | 68.4 ± 0.8$^a$ |
| Comparative Example 9 | 90.8 ± 1.2$^a$ | 58.9 ± 0.9$^a$ | 60.8 ± 0.7$^b$ |

Note:
different lowercase letters in the same column indicate significant differences between the corresponding data (P < 0.05).

What is claimed is:

1. A method for preparing concentrated high-protein yogurt, comprising:
   (A)
   heating a high-protein base material at pH of 6.6 to 6.8 and at a temperature of 80° C. to 95° C. for 10 to 30 minutes, wherein the base material has a decalcification rate 32.9% to 44.0%;

cooling to 40° C. to 45° C., adding 0.05% to 0.2% (w/w) of a starter, fermenting at 40° C. to 45° C. until the pH drops to a value of 4.9; and incubating at 0° C. to 8° C. for 12 to 36 hours to obtain the high-protein yogurt;

or, (B)

heating the high-protein base material at pH of 6.6 to 6.8 and a temperature of 80° C. to 95° C. for 10 to 30 minutes, wherein the base material comprises a decalcification rate of 32.9%;

cooling to 40° C. to 45° C., adding 0.05% to 0.2% (w/w) of a starter, and fermenting at 40° C. to 45° C. until the pH drops to a value of 5.0; and incubating at 0° C. to 8° C. for 12 to 36 hours to obtain the high-protein yogurt;

wherein the starter comprises *Lactobacillus bulgaricus* and *Streptococcus thermophilus*, with a viable bacteria count ratio being (2:1) to (1:2);

wherein protein concentration in the high-protein yogurt obtained by the method is 7 mass % to 15 mass %; and wherein the high-protein base material is prepared by:

(a) spray-drying a concentrate of milk protein concentrate (MPC) or micellar casein concentrate (MCC) to obtain MPC or MCC powder, (b) redissolving the MPC or MCC powder in skim milk or water until a protein content thereof is 7% to 15%, (c) stirring for 20 to 40 minutes, (d) homogenizing at 20 mPa to 30 mPa in cycles for 2 to 4 times, and (e) performing decalcification treatment to obtain the high-protein base material with the decalcification rate of 32.9% to 44.0%.

2. The method according to claim 1, wherein the decalcification comprises:

adding ion exchange resin into the high-protein base material, maintaining the base material at a rotating speed of 200 rpm to 400 rpm for 2 to 4 hours, and filtering with a 150-mesh to 200-mesh filter bag to remove the resin.

3. The method of claim 1, wherein the base material ingredients is the MCC powder.

4. The method of claim 2, wherein ion exchange resin is added in an amount of between 43.6 g and 59.6 g per 100 grams of casein.

5. The method of claim 1, wherein the MPC powder is MPC85 powder.

* * * * *